United States Patent
Autio et al.

(10) Patent No.: US 11,437,954 B2
(45) Date of Patent: Sep. 6, 2022

(54) PRESS AND A CONSTRUCTION COMPRISING A PRESS

(71) Applicant: LEHTOVUORI OY, Ylöjärvi (FI)

(72) Inventors: Petri Autio, Ylöjärvi (FI); Yrjö Ojanen, Ylöjärvi (FI); Eero Ojanen, Ylöjärvi (FI)

(73) Assignee: LEHTOVUORI OY, Ylöjärvi (FI)

( * ) Notice: Subject to any disclaimer, the term of this patent is extended or adjusted under 35 U.S.C. 154(b) by 61 days.

(21) Appl. No.: 16/982,926

(22) PCT Filed: Mar. 22, 2019

(86) PCT No.: PCT/EP2019/057244
§ 371 (c)(1),
(2) Date: Sep. 21, 2020

(87) PCT Pub. No.: WO2019/180205
PCT Pub. Date: Sep. 26, 2019

(65) Prior Publication Data
US 2021/0016965 A1    Jan. 21, 2021

(30) Foreign Application Priority Data
Mar. 22, 2018   (FI) .................................... 20185277

(51) Int. Cl.
*B30B 1/02*      (2006.01)
*B30B 15/14*     (2006.01)
*B65F 1/14*      (2006.01)
*H02S 40/38*     (2014.01)
*H02S 50/00*     (2014.01)

(52) U.S. Cl.
CPC ................ *H02S 40/38* (2014.12); *B30B 1/02* (2013.01); *B65F 1/1405* (2013.01); *H02S 50/00* (2013.01); *B30B 15/148* (2013.01); *B65F 2210/172* (2013.01)

(58) Field of Classification Search
CPC ....... B30B 1/02; B30B 9/3007; B30B 15/148; B30B 1/08; B65F 1/1426; B65F 1/1405; B65F 2210/172; H02S 40/38; H02S 50/00
See application file for complete search history.

(56) References Cited

U.S. PATENT DOCUMENTS 5,802,968 A  *  9/1998  Kirschner ................ B30B 1/04
                                                  100/902
2009/0145312 A1 *  6/2009  Allen .................... B30B 9/3082
                                                  100/229 R
(Continued)

FOREIGN PATENT DOCUMENTS

EP    2 955 133      12/2015
WO    2004/110659    12/2004

OTHER PUBLICATIONS

International Search Report and Written Opinion of the ISA for PCT/EP2019/057244, dated Jun. 26, 2019, 12 pages.

*Primary Examiner* — Jimmy T Nguyen
(74) *Attorney, Agent, or Firm* — Nixon & Vanderhye

(57) ABSTRACT

Disclosed is a press including a press part, at least two upper levers and at least two lower levers and a telescopic arm arranged to be moved between a shortened and an extended position by way of an actuator. The upper levers and the lower levers have ends arranged to rotate around a point of rotation. Also disclosed is a construction.

17 Claims, 5 Drawing Sheets

(56) References Cited

U.S. PATENT DOCUMENTS

| | | | |
|---|---|---|---|
| 2011/0056393 A1* | 3/2011 | Kachkovsky | B30B 15/041 100/45 |
| 2014/0041535 A1* | 2/2014 | Shearer | B30B 9/3017 100/35 |
| 2015/0101499 A1* | 4/2015 | Hitchcock | B30B 1/103 100/229 A |
| 2015/0283659 A1* | 10/2015 | Gilbert | B30B 9/326 29/225 |

* cited by examiner

PRESS AND A CONSTRUCTION COMPRISING A PRESS

This application is the U.S. national phase of International Application No. PCT/EP2019/057244 filed 22 Mar. 2019, which designated the U.S. and claims priority to FI Patent Application No. 20185277 filed 22 Mar. 2018, the entire contents of each of which are hereby incorporated by reference.

BACKGROUND OF THE INVENTION

The invention relates to a press for compressing waste and a construction comprising a press.

BRIEF DESCRIPTION OF THE INVENTION

The aim of the invention is to present a new type of press. The aim of the invention is achieved by means of a press and a construction characterised by what is disclosed in the independent claims. Preferred embodiments of the invention are disclosed in the dependent claims.

An advantage of the press in the construction according to the invention is that it fits into a small space. A further advantage is that a long movement can be achieved in a simple manner. The length of the movement can be altered with minor changes. The force of the press is almost constant over the entire movement range.

The press is intended to compress the waste in the waste container to fit more waste in the waste container. The waste may be of various types, but compressing the waste is advantageous when there is abundant airspace within the waste, for example, as with paper waste.

The press according to the invention comprises a press part, at least one upper lever and at least one lower lever and a telescopic arm arranged to be moved between the shortened and extended position by means of an actuator. The press generally comprises at least two upper levers and at least two lower levers, but it is possible that a sufficiently stable construction is achieved by means of one upper lever and one lower lever fixed on only one side.

The upper levers and lower levers have ends arranged to rotate around a point of rotation. In other words, the ends can rotate around the point of rotation on a single plane. The other ends of the levers, that is, the construction side ends, are fixed to the fixed construction when mounted in place, and the other ends of the levers, that is, the press part side ends, are fixed to the lateral surfaces of the press part. The first upper lever and the first lower lever are on the first side of the press part, and the second upper lever and second lower lever are on the second side of the press part. The press part is mounted between the first and second sides in such a way that the first upper lever and the first lower lever are fixed to the first lateral surface of the press part, and the second upper lever and the second lower lever are fixed to the second lateral surface of the press part.

The telescopic arm is mounted between the fixed construction and the press part. The telescopic arm has an end arranged to rotate around the point of rotation, that is, a construction side end, for fixing to the fixed construction, and an end arranged to rotate around the point of rotation, that is, a press part side end which is fixed to the upper part of the press part. The ends of the telescopic arm may rotate on a single plane with respect to the point of rotation. The telescopic arm is preferably fixed to the upper edge of the press part, in its centre. The telescopic arm is arranged to move between a shortened and an extended position by means of an actuator. The actuator may be a direct-current motor. The telescopic arm may be operated by a spindle motor, or in some cases a hydraulic cylinder. The actuator may be selected according to the application and the required output.

The press part is moved along an essentially vertical line by means of the levers and the telescopic arm. The levers and the telescopic arm have points of rotation at both of their ends, which may be mounted on bearings or have some other structure suitable for rotational movement. The positions of the points of rotation are chosen in such a way that in the extended position, the telescopic arm presses the press part essentially downwards, and in the shortened position pulls the press part into the rest position. The selection of the position of the points of rotation can also be affected by the design of the levers.

In the rest position, the press fits into a very small space. By varying the length of the levers, it is possible to vary the length of the movement of the press, which makes the press easily adaptable to different sizes of waste containers.

The surface height of the waste is identified as a change in the power consumption of the actuator, such as a direct-current motor, as a function of time. The type and compressibility of the waste are determined from the rate of change of the same function. Depending on the properties of the waste, the rate of change of the function varies and it is thus possible to identify the average type of waste in the waste container. Due to the above measurement, unnecessary pressing of incompressible waste is eliminated and no separate measurements of the surface height or the properties of the waste are required. The extended position of the telescopic arm changes as the waste container fills up.

The actuator is monitored by means of a sensor, where the magnitude of the direct current is measured by means of a Hall effect electronic application which measures the magnitude of the magnetic field generated by the direct current. In connection with the sensor is also a transmitter which converts the value of the magnitude of the magnetic field into a form intelligible to the control unit, for example, converts the value of the magnitude of the magnetic field into a voltage signal which is transmitted to the control unit. The control unit may be in the construction surrounding the waste container or at a distance from the construction.

The press according to the invention may be used, for example, in an outdoor waste container, where the driving force for the press is obtained from solar energy. The waste container has an external fixed wall construction which forms the external walls of the construction and a space for the press inside the walls when the press in the rest position. The horizontal cross-section of the external fixed wall construction is usually square or rectangular, whereupon the wall construction is formed by four side walls, a bottom part and a top part. The top part may be shaped. The horizontal cross-section may also differ from the above and be, for example, round or oval.

The press may be fixed to the fixed construction in several ways, and the press may be fixed to the construction either on the side of the side walls or the rear wall. The construction refers to the entity in conjunction with the waste container.t In addition to the external fixed wall construction, the construction also comprises an internal waste container open at the top, into which the waste falls when it is placed in the waste container through a hatch or the like in the fixed construction. The waste container may be provided with wheels to facilitate emptying. In the external fixed construction is a door for emptying the waste container. On the outer surface of the construction, usually on top of the construction, is a solar panel for collecting solar energy.

BRIEF DESCRIPTION OF THE FIGURES

The invention is described in greater detail in the following, in connection with preferred embodiments, with reference to the accompanying drawings, of which.

DETAILED DESCRIPTION OF THE INVENTION

Figure 1:
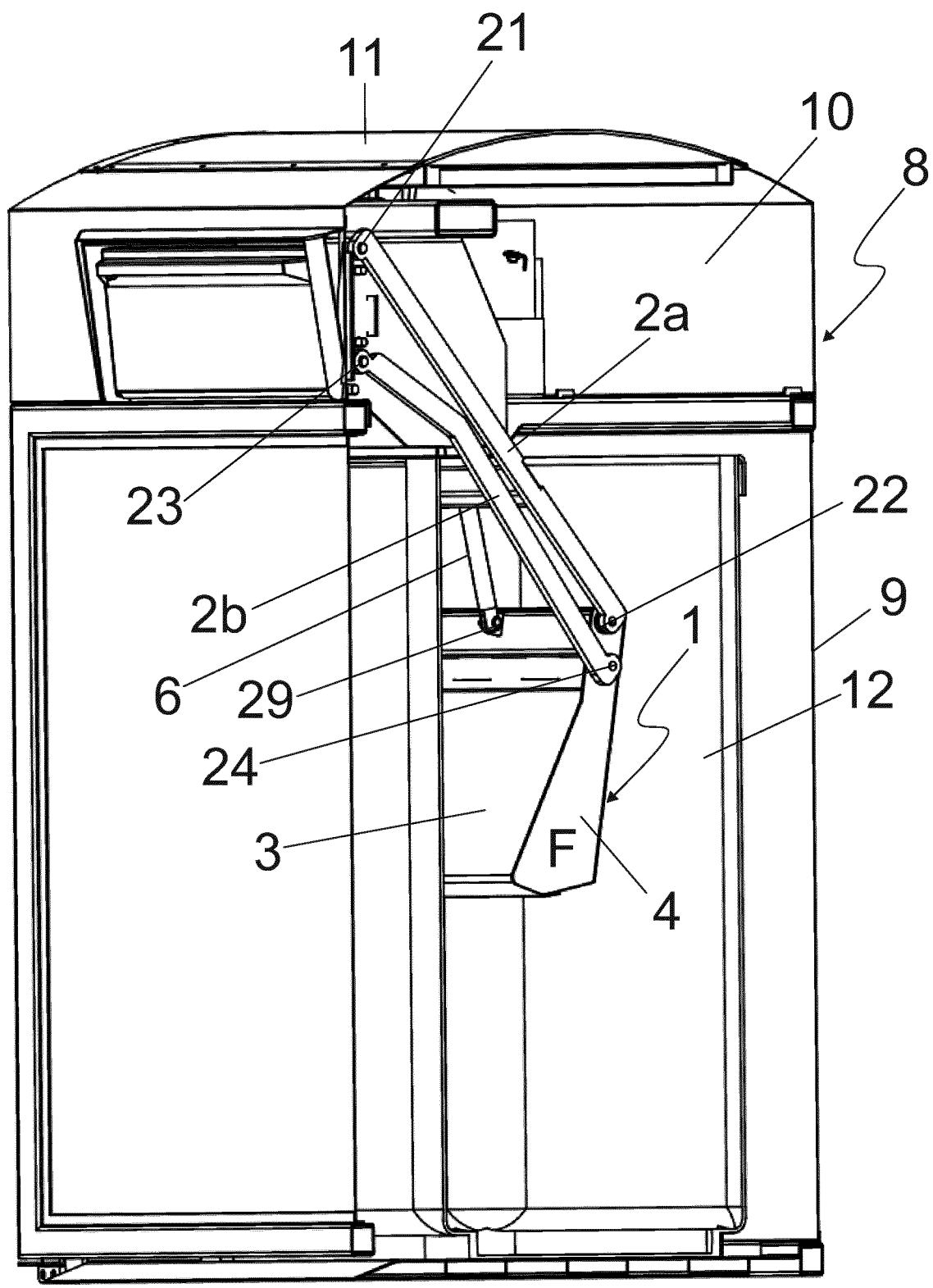
FIG. 1 shows a perspective view of the cross-section of the construction with the press when the press is in the extended position.

FIG. 1 shows a perspective view of the cross-section of the construction 8 with the press 1 when the press 1 is in the extended position. The construction 8 refers to the entity which belongs in conjunction with the waste container 12. The construction 8 around the waste container 12 comprises an external wall construction 9 consisting of walls. Inside the external construction 9 is a space 10 for the press 1. The construction 8 is provided with a solar panel 11. The waste container 12 is located inside the external construction 9, below the space 10.

The press 1 comprises a first upper lever 2a and a first lower lever 2b on the first side F of the press 1. The first upper lever 2a has a construction side end arranged to rotate around a point of rotation 21 and a press part 3 side end arranged to rotate around a point of rotation 22. The first lower lever 2b has a construction side end arranged to rotate around a point of rotation 23 and a press part side end arranged to rotate around a point of rotation 24.

The construction on the second side S of the press 1 is mirror-symmetrical with respect to the vertical axis passing through the press part 3, that is, the second side S of the press 1 comprises a second upper lever and a second lower lever. The second upper lever has a construction side end arranged to rotate around a point of rotation and a press part 3 side end arranged to rotate around a point of rotation. The second lower lever has a construction side end arranged to rotate around a point of rotation and a press part side end arranged to rotate around a point of rotation. It is also possible to implement the press with only one upper lever and one lower lever located on one or the other side of the press part 3.

On the upper part of the press part 3, essentially in the middle of the first side levers 2a, 2b and the second side levers, is fixed a telescopic arm 6, which is arranged to rotate at both ends, FIG. 1 showing the press part side point of rotation 29. In FIG. 1, the telescopic arm 6 is in its extended position.

When the telescopic arm 6 extends into its extended position by means of an actuator 7, at the same time rotating around its construction side point of rotation, the press part rotates into its working position by means of the first side F points of rotation 22, 24 and the corresponding second side points of rotation.

Figure 2:
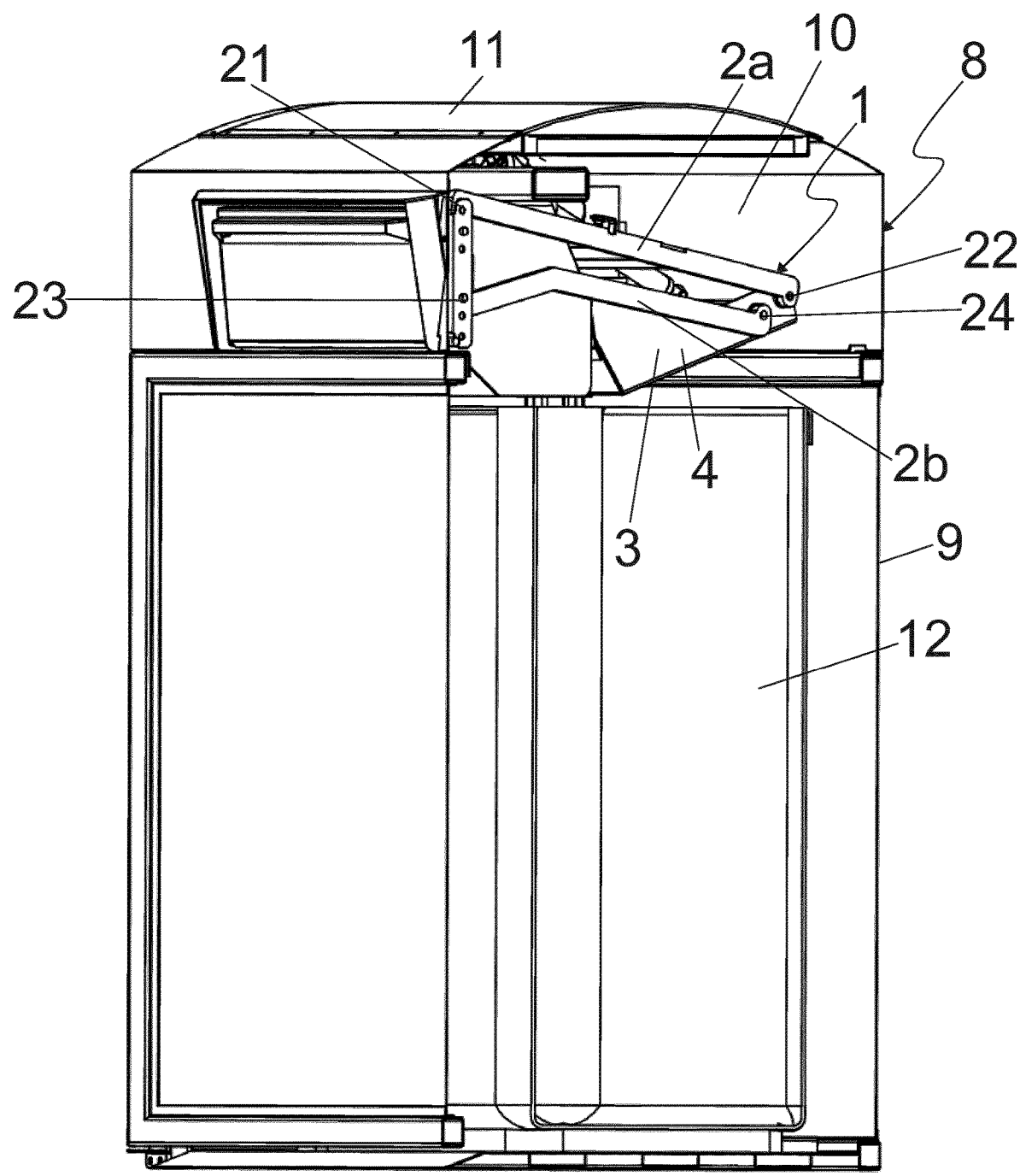
FIG. 2 shows a perspective view of the cross-section of the construction with the press when the press is in the rest position.

FIG. 2 shows a perspective view of the cross-section of the construction with a press 1 when the press 1 is in the rest position. When the telescopic arm 6 is in its shortened position, the press part 3 retracts into the rest position.

When the telescopic arm 6 retracts into its shortened position, at the same time rotating around its construction side point of rotation, the press part rotates into its rest position by means of the first side F points of rotation 22, 24 and the corresponding second side points of rotation.

In the press shown in FIGS. 1 and 2, the first side lower lever 2b and the corresponding second side lower lever have an angle.

Figure 3:
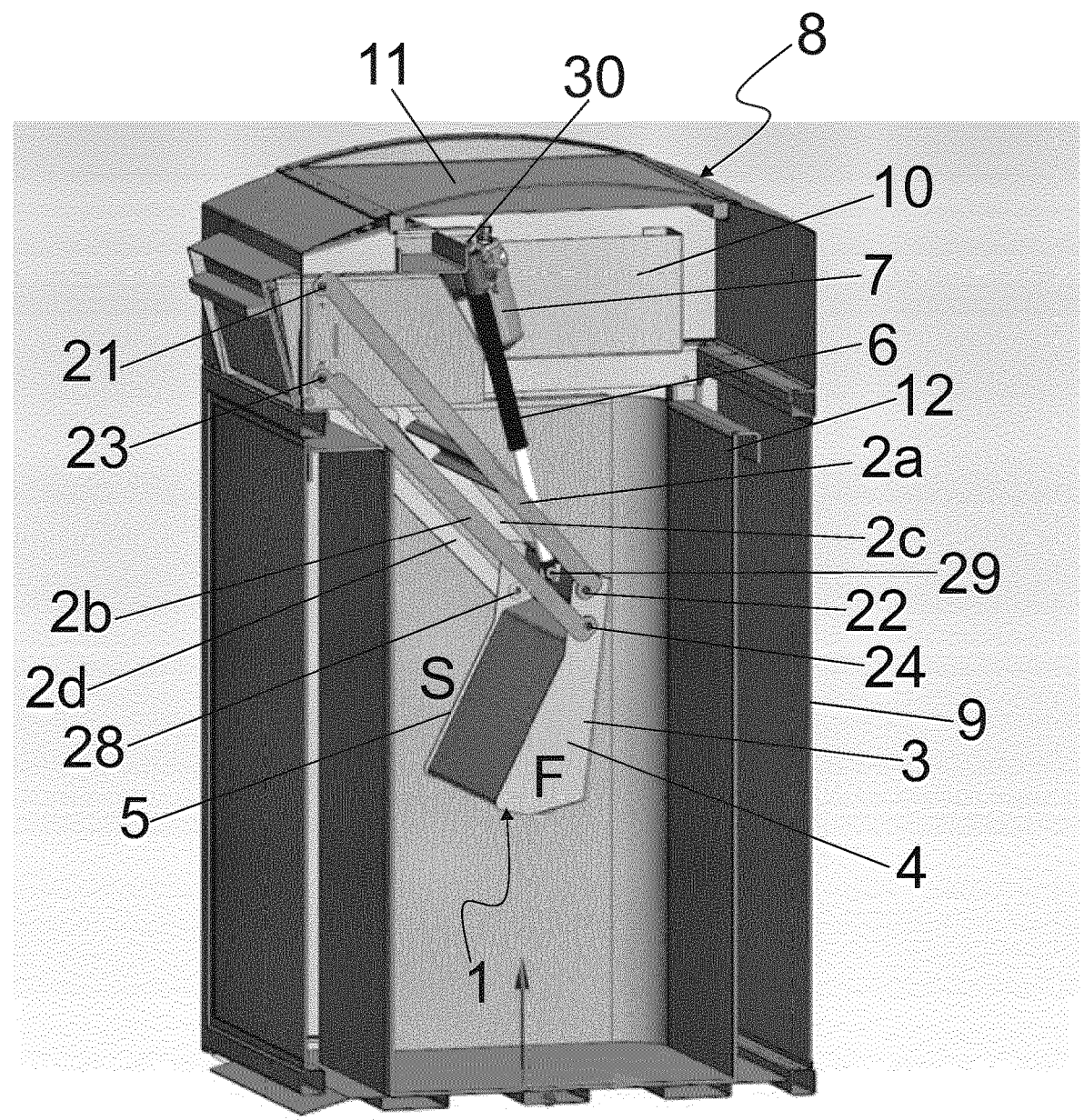
FIG. 3 shows a perspective view of the frontal cross-section of the construction when the press is in the extended position.

FIG. 3 shows a perspective view of the frontal cross-section of the construction 8 when the press 1 is in the extended position. The press 1 comprises a first upper lever 2a and a first lower lever 2b on the first side F of the press 1. The first upper lever 2a has a construction side end arranged to rotate around a point of rotation 21 and a press part side end arranged to rotate around a point of rotation 22. The first lower lever 2b has a construction side end arranged to rotate around a point of rotation 23 and a press part side end arranged to rotate around a point of rotation 24.

The press 1 comprises a second upper lever 2c and a second lower lever 2d on the second side S of the press 1. The second upper lever 2c has a construction side end arranged to rotate around a point of rotation and a press part side end arranged to rotate around a point of rotation. The first lower lever 2d has a construction side end arranged to rotate around a point of rotation and a press part side end arranged to rotate around a point of rotation 28.

The press 1 comprises a press part 3 having a first lateral surface 4 and a second lateral surface 5. The press part 3 is between the first side F and second side S of the press 1 in such a way that the press part side end of the first upper lever 2a and the press part side end of the first lower lever 2b are fixed to the first lateral surface 4 of the press part 3, and the construction side end of the first upper lever 2a and the construction side end of the first lower lever 2b are for fixing to the fixed structure of the construction. The press part side end of the second upper lever 2c and the press part side end of the second lower lever 2d are fixed to the second lateral surface 5 of the press part 3, and the construction side end of the second upper lever 2c and the construction side end of the second lower lever 2d are for fixing to the fixed structure of the construction.

On the upper part of the press part 3, essentially in the middle of the first side levers 2a, 2b and the second side levers, is fixed a telescopic arm 6, which is arranged to rotate at its press part 3 side end around the point of rotation 29 and at its construction 8 side end around the point of rotation 30. FIG. 3 shows the telescopic arm 6 in its extended position.

Figure 4:
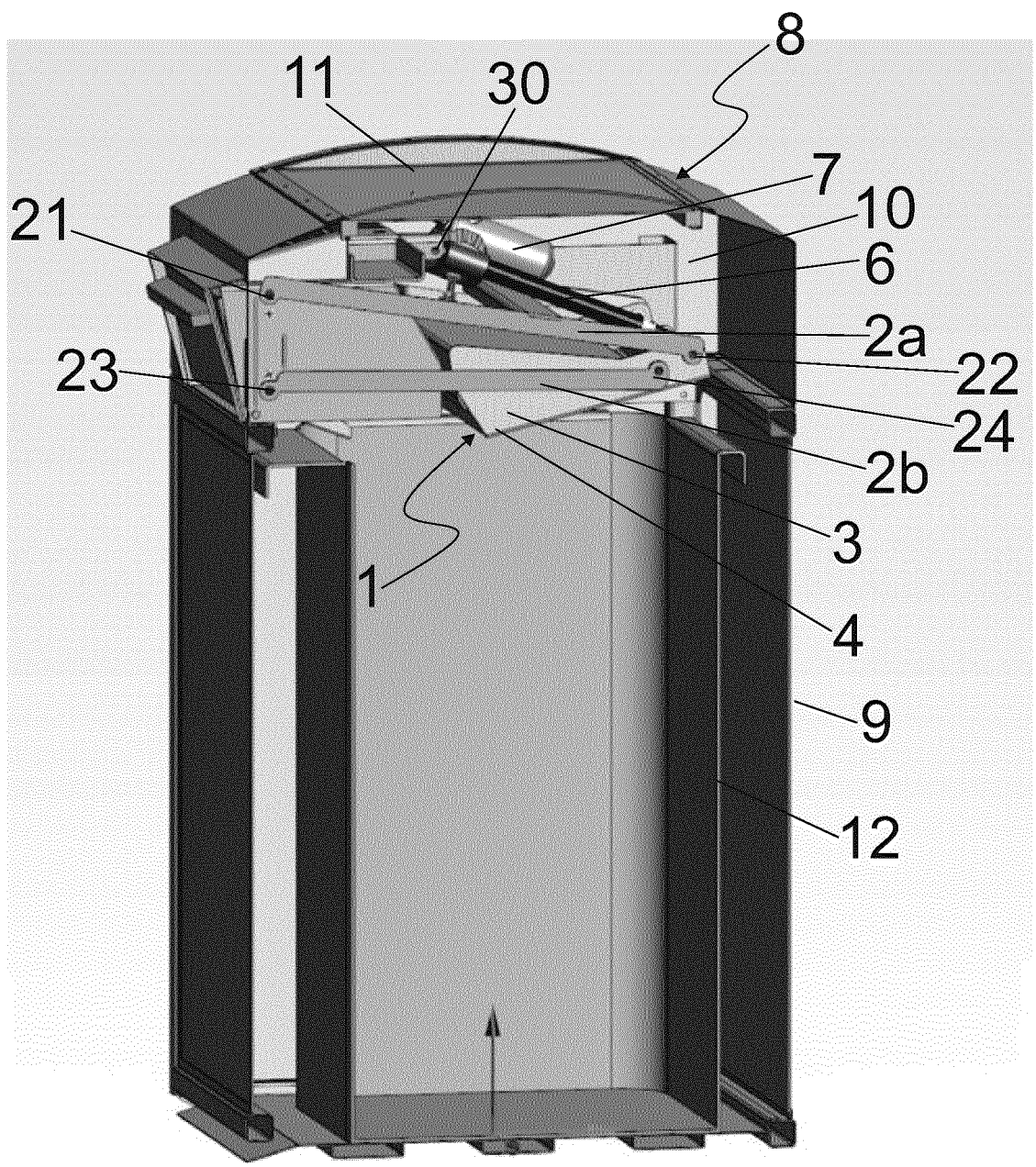
FIG. 4 shows a perspective view of the frontal cross-section of the construction when the press is in the rest position.

FIG. 4 shows a perspective front view of the frontal cross-section of the construction when the press is in the rest position. When the telescopic arm 6 is in its shortened position, the press part 3 retracts into the rest position.

When the telescopic arm 6 retracts into its shortened position, at the same time rotating with respect to its construction side point of rotation 30, the press part 3 rotates into its rest position by means of the first side F points of rotation 22, 24 and the corresponding second side points of rotation (point of rotation 28 shown in FIG. 3).

In the press according to FIGS. 3-4, the levers 2a, 2b, 2c and 2d are straight.

The presses 1 according to FIGS. 1-2 and FIGS. 3-4 differ in some details, but the basic principle is exactly the same. In other words, what is described in connection with FIGS. 1-2, applies in connection with FIGS. 3-4 and vice versa.

Figure 5:
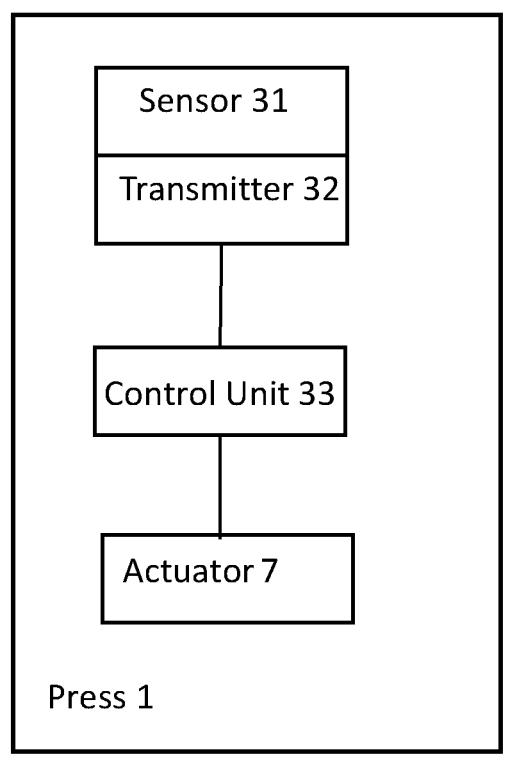
FIG. 5 is a schematic representation of the actuator being monitored by a sensor, where a transmitter transmits to a control unit.

As shown in FIG. 5, the actuator is monitored by means of a sensor 31, where the magnitude of the direct current is measured by means of a Hall effect electronic application which measures the magnitude of the magnetic field generated by the direct current. In connection with the sensor is also a transmitter 32 that converts the value of the magnitude of the magnetic field into a form intelligible to the control unit 33, for example, converts the value of the magnitude of the magnetic field into a voltage signal which is transmitted to the control unit. The control unit may be in the construction surrounding the waste container or at a distance from the construction.

It is obvious to a person skilled in the art that the basic idea of the invention can be implemented in various ways as technology develops. The invention and its embodiments are, therefore, not limited to the examples described above, but may vary within the scope of the claims.

The invention claimed is:

1. A press (1) for compressing waste, the press (1) associated with a construction (8) and comprising a press part (3),
    wherein the press part (3) comprises an upper end and an opposite, lower end, a first side (F) comprised of a first lateral surface (4), and an opposite, second side (S) comprised of a second lateral surface (5),
    wherein the press (1) further comprises
    a telescopic arm (6) having i) a construction-side end being arranged for fixing to the construction (8) to rotate around a point of rotation (30) at the construction-side end and ii) a press-part end fixed to the upper end of the press part (3) and arranged to rotate about a point of rotation (29) at the upper end of the press part (3),
    an actuator (7) configured to move the telescopic arm (6) between a shortened position to retract the press part (3) into an upper portion of the construction (8) and an extended position to rotate the press part (3) toward a bottom portion of the construction (8),
    a first upper lever (2a) located on the first side (F) of the press (1), the first upper lever (2a) having
    i) a construction-side end for fixing to a first part of the construction to rotate around a first construction-side point of rotation (21) on the first part of the construction, and
    ii) a press-part side end fixed to an upper end of the first lateral surface (4) and arranged to rotate around a first press-side point of rotation (22) on the first lateral surface (4) of the press part (3),
    a second upper lever (2c) on the second side (S) of the press (1), the second upper lever (2c) having
    i) a construction-side end for fixing to a second part of the construction to rotate around a first construction-side point of rotation on the second part of the construction, and
    ii) a press-part side end fixed to an upper end of the second lateral surface (5) and arranged to rotate around a first press-side point of rotation on the second lateral surface (5) of the part (3),
    a first lower lever (2b) on the first side of the press (1), the first lower lever (2b) having
    i) a construction-side end for fixing to the first part of the construction to rotate around a second construction-side point of rotation (23) on the first part of the construction, and
    ii) a press-part side end fixed to the upper end of the first lateral surface (4) and arranged to rotate around a second press-side point of rotation (24) on the first lateral surface (4) of the part (3),
    a second lower lever (2d) on the second side (S) of the press (1), the second lower lever (2d) having
    i) a construction-side end for fixing to the second part of the construction to rotate around a second construction-side point of rotation on the second part of the construction, and
    ii) a press-part side end fixed to the upper end of the second lateral surface (5) and arranged to rotate around a second press-side point of rotation (28) of the second lateral surface (5) of the part (3),
    wherein the press-part side end of the first upper lever (2a) is fixed to the upper end of the first lateral surface (4) at a first position above a second position where the press-part side end of first lower lever (2b) is fixed to the upper end of the first lateral surface (4) so that the first upper level (2a) is above the first lower lever (2b) in both of the shortened position and extended position of the actuator (7),
    wherein the press-part side end of the second upper lever (2c) is fixed to the upper end of the second lateral surface (5) at a third position above a fourth position where the press-part side end of second lower lever (2d) is fixed to the upper end of the second lateral surface (5) so that the second upper level (2c) is above the second lower lever (2d) in both of the shortened position and extended position of the actuator (7), and
    wherein the first press-side points of rotation of the first and second upper levers are above the second press-side points of rotation of the first and second lower levers in both of the shortened position and extended position of the actuator (7).

2. The press as claimed in claim 1, wherein the points of rotation of the first and second upper and lower levers (2a, 2b, 2c, 2d) are mounted in bearings.

3. The press as claimed in claim 1, wherein the points of rotation of the telescopic arm (6) are mounted in bearings.

4. The press as claimed in claim 1, wherein the actuator (7) is a direct-current motor.

5. The press as claimed in claim 4, wherein the press (1) comprises a sensor for measuring a change in power consumption of the direct-current motor.

6. The press as claimed in claim 4, wherein the press (1) comprises a transmitter for transmitting measurement results to a control unit.

7. The press as claimed in claim 2, wherein the points of rotation of the telescopic arm (6) are mounted in bearings.

8. The press as claimed in claim 2, wherein the actuator (7) is a direct-current motor.

9. The press as claimed in claim 3, wherein the actuator (7) is a direct-current motor.

10. The press as claimed in claim 5, wherein the press (1) comprises a transmitter for transmitting measurement results to a control unit.

11. A construction (8) comprising a press (1) for compressing waste, the press comprising a press part (3),
    wherein the press part (3) comprises an upper end and an opposite, lower end, a first side (F) comprised of a first lateral surface (4), and an opposite, second side (S) comprised of a second lateral surface (5), wherein the press (1) further comprises
a telescopic arm (6) having i) a construction-side end being arranged for fixing to the construction (8) to rotate around a point of rotation (30) at the construction-side end and ii) a press-part end fixed to the upper end of the press part (3) and arranged to rotate about a point of rotation (29) at the upper end of the press part (3),
an actuator (7) configured to move the telescopic arm (6) between a shortened position to retract the press part (3) into an upper portion of the construction (8) and an extended position to rotate the press part (3) toward a bottom portion of the construction (8),
a first upper lever (2*a*) located on the first side (F) of the press (1), the first upper lever (2*a*) having
i) a construction-side end for fixing to a first part of the construction to rotate around a first construction-side point of rotation (21) on the first part of the construction, and
ii) a press-part side end fixed to an upper end of the first lateral surface (4) and arranged to rotate around a first press-side point of rotation (22) on the first lateral surface (4) of the press part (3),
a second upper lever (2*c*) on the second side (S) of the press (1), the second upper lever (2*c*) having
i) a construction-side end for fixing to a second part of the construction to rotate around a first construction-side point of rotation on the second part of the construction, and
ii) a press-part side end fixed to an upper end of the second lateral surface (5) and arranged to rotate around a first press-side point of rotation on the second lateral surface (5) of the part (3),
a first lower lever (2*b*) on the first side of the press (1), the first lower lever (2*b*) having
i) a construction-side end for fixing to the first part of the construction to rotate around a second construction-side point of rotation (23) on the first part of the construction, and
ii) a press-part side end fixed to the upper end of the first lateral surface (4) and arranged to rotate around a second press-side point of rotation (24) on the first lateral surface (4) of the part (3),
a second lower lever (2*d*) on the second side (S) of the press (1), the second lower lever (2*d*) having
i) a construction-side end for fixing to the second part of the construction to rotate around a second construction-side point of rotation on the second part of the construction, and
ii) a press-part side end fixed to the upper end of the second lateral surface (5) and arranged to rotate around a second press-side point of rotation (28) of the second lateral surface (5) of the part (3),
wherein the press-part side end of the first upper lever (2*a*) is fixed to the upper end of the first lateral surface (4) at a first position above a second position where the press-part side end of first lower lever (2*b*) is fixed to the upper end of the first lateral surface (4) so that the first upper level (2*a*) is above the first lower lever (2*b*) in both of the shortened position and extended position of the actuator (7),
wherein the press-part side end of the second upper lever (2*c*) is fixed to the upper end of the second lateral surface (5) at a third position above a fourth position where the press-part side end of second lower lever (2*d*) is fixed to the upper end of the second lateral surface (5) so that the second upper level (2*c*) is above the second lower lever (2*d*) in both of the shortened position and extended position of the actuator (7), and
wherein the first press-side points of rotation of the first and second upper levers are above the second press-side points of rotation of the first and second lower levers in both of the shortened position and extended position of the actuator (7).

12. The construction as claimed in claim 11, further comprising a solar panel (11) for collecting power for the press (1).

13. The construction of claim 11, wherein the points of rotation of the first and second upper and lower levers (2*a*, 2*b*, 2*c*, 2*d*) are mounted in bearings.

14. The construction of claim 11, wherein the points of rotation of the telescopic arm (6) are mounted in bearings.

15. The construction of claim 11, wherein the actuator (7) is a direct-current motor.

16. The construction of claim 15, wherein the press (1) comprises a sensor for measuring a change in power consumption of the direct-current motor.

17. The construction of claim 16, wherein the press (1) comprises a transmitter for transmitting measurement results from the sensor to a control unit.

\* \* \* \* \*